United States Patent [19]

Imura et al.

[11] 4,119,982
[45] Oct. 10, 1978

[54] SMALL SIZE SINGLE LENS REFLEX CAMERA

[75] Inventors: Toshinori Imura; Maki Yamashita, both of Sakai, Japan

[73] Assignee: Minolta Camera Kabushiki Kaisha, Osaka, Japan

[21] Appl. No.: 727,357

[22] Filed: Sep. 28, 1976

[30] Foreign Application Priority Data

Sep. 29, 1975 [JP] Japan .................. 50-116440
Oct. 28, 1975 [JP] Japan ............. 50-146121[U]

[51] Int. Cl.$^2$ .................................... G03B 19/12
[52] U.S. Cl. ................................................ 354/155
[58] Field of Search ............ 354/152, 156, 154, 155, 354/224, 225

[56] References Cited

U.S. PATENT DOCUMENTS

| 1,957,128 | 5/1934 | Ball et al. ........................... 354/225 |
| 3,250,195 | 5/1966 | Maitani ............................... 354/155 |
| 3,911,454 | 10/1975 | Ohmori ............................... 354/154 |
| 3,940,779 | 2/1976 | Kuromoto et al. ............... 354/152 X |

FOREIGN PATENT DOCUMENTS

| 208,251 | 11/1955 | Australia .................................. 354/155 |
| 1,252,523 | 10/1967 | Fed. Rep. of Germany .......... 354/152 |

*Primary Examiner*—Donald A. Griffin
*Attorney, Agent, or Firm*—Harold L. Jackson; Stanley R. Jones; Joseph W. Price

[57] ABSTRACT

A small single lens reflex camera for use with a 110 film format cartridge is provided. The size of the camera body can be maintained at a minimum by an improved view finder optical system which coacts with a movable mirror movable into and out of the photographic path in correlation with the releasing operation of a shutter. A series of reflecting mirrors are utilized in the viewfinder assembly within certain angular design parameters to maintain a compact shape while permitting a highly accurate focusing system. The viewfinder optical system can be assembled as a relatively stationary sealed module unit. The movable mirror is adjustable relative to the optical path to optimize its alignment and calibration focusing of an image on the focusing plate of the module viewfinder.

12 Claims, 10 Drawing Figures

SMALL SIZE SINGLE LENS REFLEX CAMERA

BACKGROUND OF THE INVENTION

1. Field of the Invention

The present invention is directed to a small single lens reflex camera of the 110 film format variety and more particularly to an improved view finder optical system that maintains the compact size of the camera body.

2. Brief Description of the Prior Art

The introduction of a 110 film format into the commercial market in 1972 excited an interest in attempting to achieve the versatility of a 35mm single lens reflex (SLR) with the appeal of a pocketable camera. The now famous Kodak INSTAMATIC pocket camera accompanied the introduction of the 110 film cartridge but was limited in providing quality photography.

A commercial reality in the photography field is the domination of film manufacturers in setting film parameters which must be adhered to in the designing of a compatible camera. In this regard, the 110 film cartridge established the minimum dimensions of the 110 camera, this also placed a limitation on the location and size of a mirror in a 110 SLR camera. The film format size of 13 × 17 millimeters placed additional limitations on the possible camera optical systems.

One of the stringent demands placed on the designing of a 110 SLR camera is the high requirement of accuracy in the focusing system. This accuracy requirement is about twice as stringent as that for a 35mm SLR camera because the 110 film image must be enlarged about twice that of a 35mm to obtain an equal size final image. Generally, a quality 35mm SLR camera will specify an optical path tolerance between the focusing plane and the film plane of a ±0.02mm. An equal picture quality 110 SLR camera will have to provide for a plus or minus tolerance of 0.01mm. The viewfinder system being of critical importance since any focusing errors will be enlarged when the final image is prepared.

Another stringent demand on the focusing system of a 110 SLR camera occurs when the focusing is also utilized to adjust the lens aperture for proper exposure. Since the speed of most of the film of a 110 format, e.g., ASA 64-80, is limited, the use of supplemental flash lighting is important. Thus, the accuracy of focusing can be important in determining the correct flash exposure in a 110 SLR camera.

The advantages of an SLR camera along with the portability and convenience of a 110 cartridge camera size demands a more stringent focusing system while still maintaining the compact camera body.

An additional problem in designing a competitive compact 110 SLR camera is manufacturing cost. Thus, not only a small lightweight compact design must be provided, but both improved focusing capabilities with an economical manufacturing procedure must be provided to have a successful commercial product.

Various viewfinder optical systems are known in single lens reflex cameras such as the use of reflecting surfaces in a roof configuration to provide a viewfinder image that is not inverted. Generally, 35mm SLR viewfinder optical systems seeking to use a roof reflector configuration will utilize a prism having a pentagonal cross-section. Viewfinder optical systems, however, using a penta-prism are generally heavy and further difficult to manufacture. These design and cost impediments are particularly unacceptable in a compact 110 SLR camera.

Suggestions have been made to overcome the shortcomings of a penta-prism viewfinder system by the use of a plurality of reflecting mirrors to form a porro-prism optical system. Problems exist with this design in providing the spacing necessary between the reflecting mirrors. These problems are again compounded in attempting to maintain the compact size of a 110 SLR camera.

Thus, the conflicting design parameters associated with a commercial 110 SLR camera are still being sought to be satisfied by the prior art.

SUMMARY OF THE INVENTION

It is an object of the present invention to provide a single lens reflex camera capable of using a 110 size film strip.

It is another object of the present invention to provide a lightweight small single lens reflex camera which can be manufactured at a low cost.

It is yet another object of the present invention to provide a single lens reflex camera having a viewfinder optical system of the porro-prism type which may provide substantially the same magnification as that obtained by the prior art single lens reflex cameras while maintaining a camera body size which is substantially the same as that of the pocket cameras.

It is still a further object of the present invention to provide a small size single lens reflex camera having a separate module viewfinder optical system which is sealed to prevent the ingress of dust and which can be calibrated by the relative adjustment of an exterior optical element.

The present invention includes a camera body adapted to receive a taking lens assembly having an optical path through the camera body. A movable mirror is mounted relative to the camera body between a first position intersecting the optical path and a second position not intersecting the optical path. A module viewfinder optical system is attached to the camera body as a subassembly and is operatively positioned relative to the first position of the movable mirror to receive light rays from the movable mirror. The viewfinder optical system includes at least three reflecting mirrors and a focusing surfacing member for providing an image of the object. The first and second reflecting mirror forms an included angle of substantially 90° between the reflecting surfaces and is further inclined relative to the horizontal angle, $\beta$, formed between an incident optical axis, $L_5$ to the first reflective mirror and an emitting optical axis, $L_7$, from the second reflecting mirror is set within the range of 4° to 32°. The third reflecting mirror further transmits the light rays to a magnifying eye piece. The angle formed between the reflecting surface planes of the third reflecting mirror and the movable mirror being within the range of 92° and 106°. The movable mirror being mounted on a pivotable support member that permits a relative calibrating movement of the mirror along the optical path for both focusing the viewfinder optical system and for alignment of the image.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

The following description is provided to enable any person skilled in the optics and camera field to make and use the invention and sets forth the best modes contemplated by the inventors of carrying out their invention. Various modifications, however, will remain readily apparent to those skilled in the art since the generic principals of the present invention have been defined herein specifically to provide a relatively economical and easily manufactured 110 SLR camera.

Figure 1:
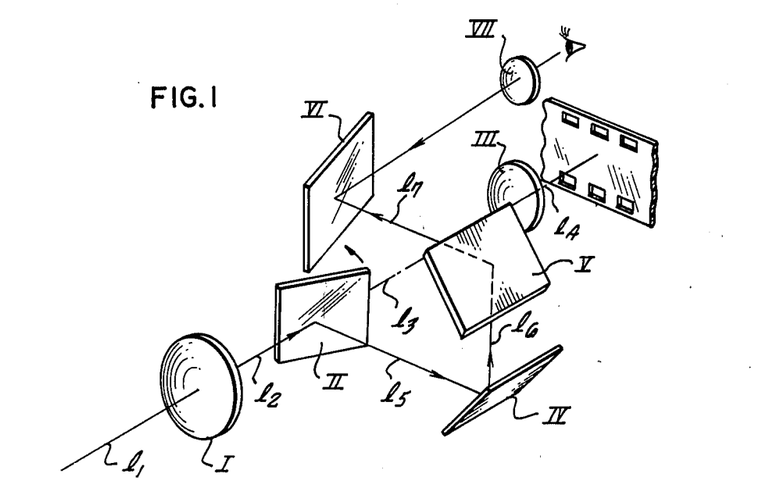
FIG. 1 is a schematic perspective view of a viewfinder optical system.

Reference is made to FIG. 1 to disclose the general optical elements associated with a camera viewfinder optical system. Primarily, the viewfinder optical system attempts to provide an image of an object which will not be inverted and will be clear and bright. The light rays extending along an optical path $1_1$ from an object is transmitted through an objective lens, I, and continues along the optical path $1_2$. A movable reflecting mirror, II, is arranged at an angle of 45° to the optical path of the objective lens, I, and reflects the transmitted light rays in the direction of a viewfinder optical path, $1_5$. Usually, the movable reflecting mirror, II, can be optionally placed within the optical axis of the objective lens, I, and when it is removed, the transmitted light will continue on the optical axis $1_3$ to be focused through a master relay lens, III, along the optical axis $1_4$, for exposure on the surface of a film.

The light, which is reflected by the moving mirror, II, in the viewfinder direction $1_5$, is further reflected by a first reflecting mirror, IV, in the direction, $1_6$, and then by a second reflecting mirror, V, in the direction, $1_7$. While not shown, a focusing surface member, to realize an image, is generally provided in the optical path of the viewfinder system. The third reflecting mirror, VI, is usually arranged at an angle of 45° to the direction $1_7$ of the incident light rays for reflecting the light rays towards a lens eye piece, VII, which can magnify the image for the viewer.

In the above described viewfinder optical system, the sizes of the respective reflective mirrors are generally dependent upon the position of the focusing plate. As a general design rule, when reflecting a light on the image side of an objective lens, the area of a reflecting mirror should be progressively increased as it is positioned closer to a focusing plate. Thus, in the embodiment of FIG. 1, if a focusing plate is provided on the optical axis of $1_5$, the size of the movable mirror II would be larger as compared, for example, with the third reflecting mirror, VI. Conversely, when the focusing plate is provided on the optical axis $1_7$, the third reflecting mirror VI, would be larger than the movable reflecting mirror II. The proof of this general rule of design can be easily accomplished by a simple ray tracing. The position of the focusing plate is frequently determined by the dimensional design considerations of the camera body and accordingly the sizes of the respective reflecting mirrors will depend on the position of the focusing plate.

As can be readily appreciated, the necessity of having extremely accurate and bright focusing in a small size camera, particularly a camera utilizing a 110 size film with a film image surface of 13 × 17 millimeters, is important. The image of an object formed on a focusing plate in this form of camera will be extremely small so that the image of the object must be magnified through an eye piece lens element with a high ratio of magnification. This requirement of a high ratio of magnification requires the focusing plate to be positioned closer to the eye piece lens, VII, and also in close vicinity to the focusing plate or focusing surface member. As a result of this design requirement, the size of the third reflecting mirror must be considerably increased as compared with that of the movable mirror, II.

Figure 2:
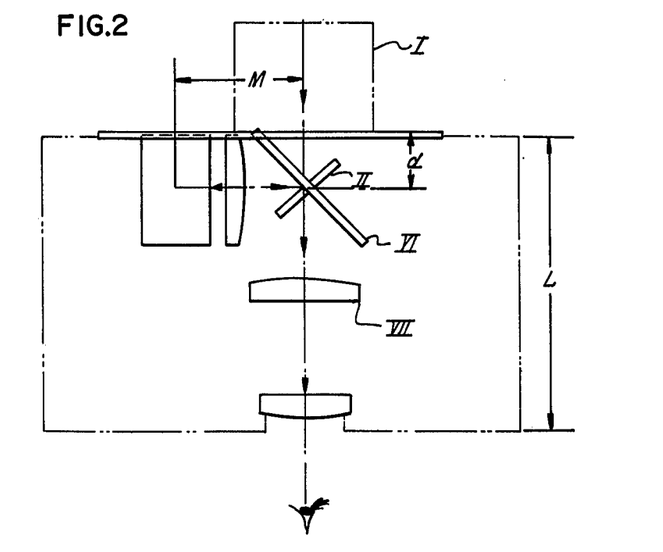
FIG. 2 is a diagrammatic plan view of a hypothetical camera layout design in which a viewfinder optical system is used for a 110 film format.

FIG. 2 discloses a hypothetical 110 SLR camera format wherein the conventional design guidelines of a viewfinder optical system mentioned with respect to FIG. 1 are used. As can be readily appreciated the purpose of using a 110 film cartridge is to maintain portability of a camera in a pocket size format. The dimensional size limitations require the length, L, from the front end of the camera body to the eye piece along the film optical axis to be about 50mm. The distance, d, from a taking lens to the movable mirror, II, or to the third reflecting mirror, VI, should be about 8mm. This distance is determined by the focal length of $f = 25$mm for a taking lens corresponding to a standard lens and the space required for the respective reflecting mirrors.

In contrast to that requirement, the actual size of the image surface of an 110 size film is 13 × 17 millimeters and the size of the third reflecting mirror, VI, on the image size of the taking lens should be at least 8.5mm as measured from the center of the mirror along the optical axis. Assuming that the ratio of the area of viewfinder image to the picture area is not less than 85%, the lengths of the focusing plate and the third reflecting mirror from their center to their one ends in the direction parallel to the optical axis of the objective must be theoretically not less than 7.2mm. Therefore, their practical lengths should be not less than 9mm, since a surplus length should be added to the theoretical length so that the focusing plate and the third reflex mirror may receive and reflect the full image of the object scene, with some further surplus being left at pheripheries of the plate and mirror for the support thereof. As a result, the front end of the third reflecting mirror, VI, would project from the front end of the camera body as shown in FIG. 2 for a 50mm camera length. Thus, if the conventional prior art viewfinder porro-prism design configuration is adopted then it would be impossible to manufacture a small size single lens reflex camera without significantly increasing the dimensions of the prior art pocket camera.

Figure 3:
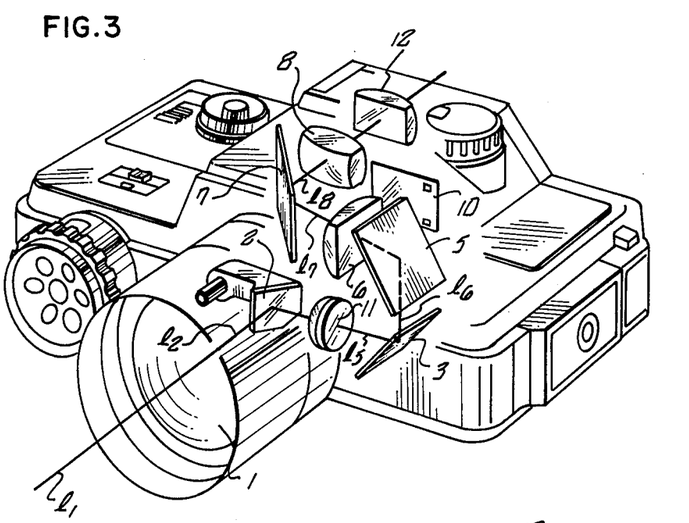
FIG. 3 is a perspective partial view of one embodiment of the present invention.
Figure 4:
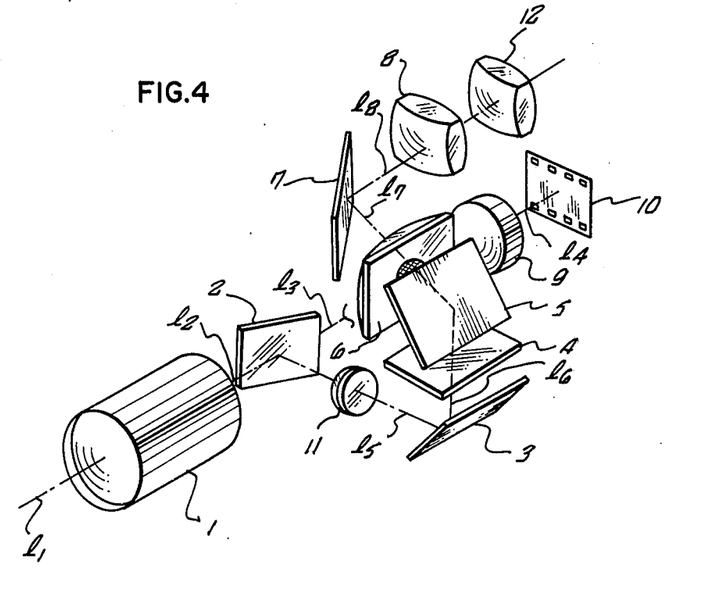
FIG. 4 is a schematic perspective view showing the viewfinder optical system of the embodiment of FIG. 3.

Referring to FIG. 3, a perspective view of one embodiment of the present invention is disclosed in the form of a pocket camera body. Reference can also be made to FIG. 4 to disclose the optical elements clearly set apart from the camera body. An afocal lens system 1, forming a part of both the objective lens system of the camera and the viewfinder lens system is attached to the camera body. A movable mirror 2, which will be more fully described hereinafter, is positioned at an angle of 45° to the optical axis $1_1$ and $1_2$. The movable mirror 2, is shown for a pivotal mounting arrangement in FIGS. 3 through 5, positioned within the optical path of the camera body to permit focusing through the viewfinder lens system. As can be appreciated by those skilled in the optical art, the movable mirror could be alternatively mounted to permit a sliding movement. Basically, it is necessary for the movable mirror to have one position intersecting the optical path and a second position, generally correlated with the shutter release, to permit the taking of a picture. In the viewfinder position disclosed, the movable mirror reflects incident light from the objective lens at a right angle along the optical axis $1_5$.

When the movable mirror 2, is retracted from the path of light passing through the objective lens 1 along the optical axis $1_2$, then the light rays will continue along the optical axis $1_3$, to be focused through a master lens 9, shown in FIG. 4 and directed along the optical axis $1_4$ onto the film 10.

The light reflected along the optical axis $1_5$, is directed by way of a master viewfinder lens 11 into the viewfinder optical system. The importance of the movable mirror 2 in providing an initial calibration for focusing and alignment to insure a full image reflection will be subsequently discussed.

The image light rays directed to the master lens 11, will be reflected at substantially a 90° reflection upward by the reflecting mirror 3, along the optical axis $1_6$. A dust protective glass plate 4, shown in FIG. 4, can be inserted between the first reflecting mirror 3, and a second reflecting mirror 5, which will further reflect the image rays along an optical axis $1_7$. The combination of the reflecting mirrors will insure an upright noninverted image. A focusing plate or focusing surface member 6, realizes the image within the viewfinder system. The first and second reflecting mirrors form substantially a 90° included angle between their reflective surfaces and are tilted or inclined toward the film plane in their mounting within the viewfinder module in accordance with one parameter of the invention.

The viewfinder image realized on the focusing plate 6, is further reflected by a third reflecting mirror 7 to the eye piece lens system 8 and 12 on the optical axis $1_8$ to be viewed by the observer.

Figure 5:
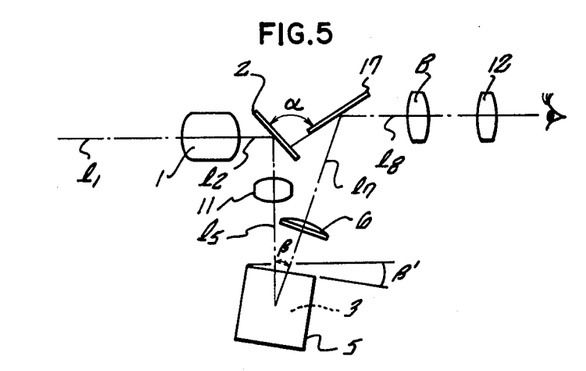
FIG. 5 is a plan view showing the viewfinder optical system of FIG. 3.
Figure 6:
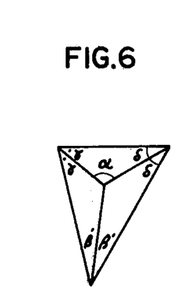
FIG. 6 is an illustrative plan view disclosing the angle of the surface of the reflecting mirror in the embodiment of FIG. 3.
Figure 7:
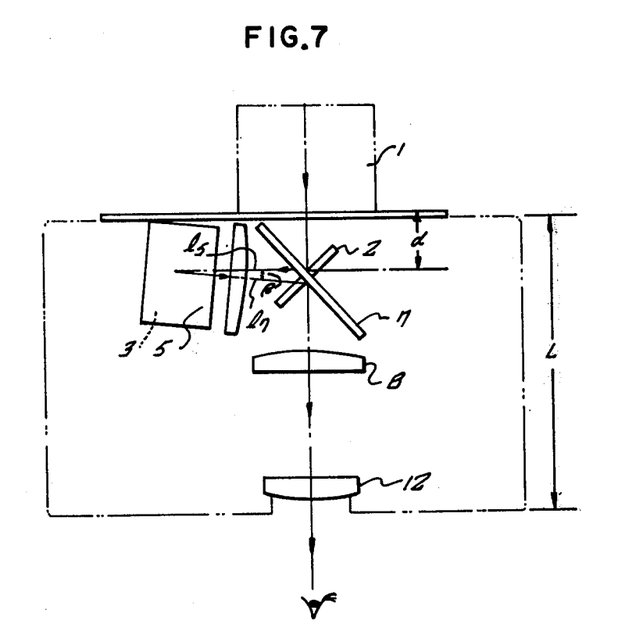
FIG. 7 is a plan view of another embodiment of the present invention.

Referring to FIGS. 5 and 6, the first and second reflecting mirrors 3 and 5 are inclined by an angle $\beta$. To prevent interference of the objective lens 1, with the third reflecting mirror 7 in the limited space of a pocket camera body, the third reflecting mirror 7, must be positioned a minimum distance on the image side of the objective lens 1. The distance required for location of the third reflecting mirror 7 will be increased as the angle $\beta$ is increased. As can be appreciated, if the third reflecting mirror 7, is spaced too far toward the film plane then it will be necessary to increase the effective diameter of the third reflecting mirror so that the entire image on the focusing plate 6 may be directed to the eye piece lens system 8 and 12. However, any increase in the third reflecting mirror 7 must take into account its relative position to the eye piece 8 due to the limited space in a pocket camera body.

The condition as to how much the focusing plate and the third reflecting mirror should be deviated from the position as shown in FIG. 2 can also be defined by using an intersecting angle $\alpha$ of the third reflecting mirror with the movable mirror at the viewing position thereof, in place of the angle $\beta$ between the optical axes $1_5$ and $1_7$ of the mirrors 3 and 5. As shown in FIG. 4, the optical axis $1_2$ and the optical axis $1_8$ should be aligned or at least in parallel with each other, so that the intersecting angle $\alpha$ of the movable mirror 2 with the third reflecting mirror 7 can be illustrated graphically as in FIG. 6 in relation with the angle $\beta$ between the optical axises $1_5$ and $1_7$. In FIG. 6, $\gamma$ is the angle that the optical axis $1_5$ makes with the surface of the movable mirror 2, $\delta$ is the angle between the optical axis $1_7$ and the surface of the third reflecting mirror 7, and 3' represents an assumptive plane as a substitution of the surfaces of mirrors 3 and 5. Accordingly, the intersecting angle $\alpha$ will be as follows:

$$\alpha = 180° - (\gamma + \delta)$$

As the total sum of three interior angles of a triangle is 180°, $$2(\gamma + \delta) + \beta = 180°$$

$$\gamma + \delta = 90° - (\beta/2)$$

Accordingly, $$\alpha = 180° - [90° - (\beta/2)] = 90° + (\beta/2) \qquad (1)$$

A pocket camera using a 110 size film and having a shape of flat rectangular prism is usually provided with a standard lens of $f = 25$ mm or zoom lens of $f = 25$ to 50 mm as the objective lens assembly. If these lens are utilized, the distance $d$, from the center of the movable reflecting mirror to the objective lens attaching plane, i.e., the front surface of the camera body where the objective lens is attached, should be about 8 mm at the maximum from the consideration of the focal length of the objective and spaces for the accommodation of the movable mirror and the first reflecting mirror which have respectively sufficient sizes for introducing full image of an object scene to hte focusing plate. Further, the distance $d$ should be determined taking into account the space for accommodating in a camera body a receptacle for a film cartridge, shutter mechanism and diaphragm mechanism which are arranged one after another along the optical axis of the objective lens. It is to be noted here that the camera body should have the size of about 50 mm with respect to the direction of the optical axis of the objective lens so that the camera body is as compact as that of conventional pocket camera.

On the other hand, the focusing plate 6 and the third reflecting mirror 7 should not be less than 9 mm, as discussed before, in size from the center to one end thereof in the direction parallel to the optical axis of the objective lens, providing that the ratio of area of viewfinder image to the picture area is not less than 85% and at the third reflecting mirror receives full image of the object scene focused on the focusing plane of the size same as that of picture frame of the camera, i.e., 13 × 17 mm. Therefore, if the optical axis $l_5$ is aligned with the optical axis $l_7$ as shown in FIG. 2, then the front ends of the focusing plate and the third reflecting mirror protrude by 1 mm at minimum from the objective lens attaching plane. In the meantime, the distance from the intersection of the optical axises $l_5$ and $l_7$ to the focusing plane of the center of the movable mirror 2 or the third mirror 7 is estimated to be about 13 mm from the consideration of sizes of the first and the second reflecting mirrors and the focusing plate and spaces for accommodating them without interference therebetween. Accordingly, in order that the front end of the focusing plate and the third reflecting mirror may not protrude from the objective lens attaching plane, the angle $\beta$ should be more than the minimum allowable value $\beta$ min which is given by the following formula:

$$\sin \beta \min = (1/13) \text{ therefore } \beta = 4$$

Thus, the angle $\beta$ should be more than 4°.

Figure 8:
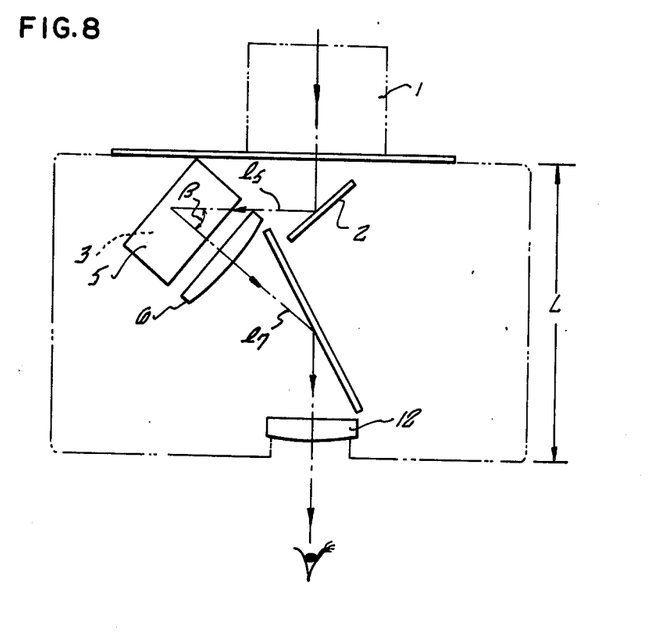
FIG. 8 is a plan view of still another embodiment of the present invention.

As apparent from the above discussion, the larger the angle $\beta$ becomes, the further the front ends of the focusing plate and the third reflecting mirror can be spaced from the objective lens supporting plane. However, at the same time the size of the third reflecting mirror 7 should be increased with the increase of the angle $\beta$ in order to cover the full image. Consequently, the rear of the third reflecting mirror would interfere with the eyepiece 12, which should be arranged at a distance of 50 mm from the objective lens supporting plane in consideration of the compactness of the pocket camera using a 110 size film. Thus, the angle $\beta$ should be less than the minimum angle that would create the interference. The minimum value of the angle $\beta$ that causes the interference is estimated to be 32° from the graphical consideration as shown in FIG. 8. Thus the deviation angle $\beta$ should be between 4° and 32°. From the equation (1), the intersecting angle $\alpha$ of the third reflecting mirror and the movable mirror should be within the following range.

$$92° < \alpha < 106°$$

Figure 9:
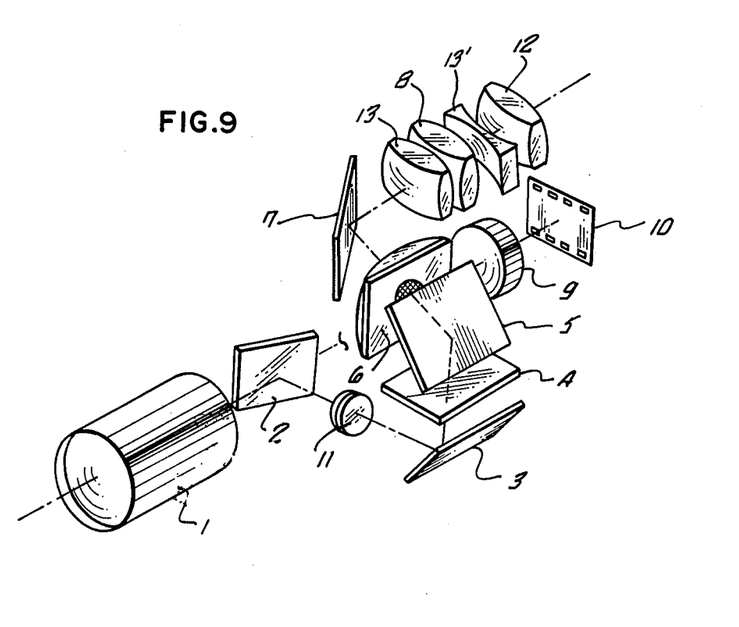
FIG. 9 is a schematic perspective view of a viewfinder optical system of yet another embodiment of the present invention.

Another embodiment of the present invention is disclosed in a perspective view in FIG. 9. In this embodiment, the eyepiece lens system or magnifier lens comprises a concave lens 13 and a convex lens 13' that is removably inserted on opposite sides of the eyepiece 8. This magnifier lens further improves the accuracy in focusing by providing a bright large image. This improvement, however, comes at the sacrifice of space and must be considered in the positioning of the third reflective mirror 7 relative to the conves lens 13 in the magnifying system.

Figure 10:
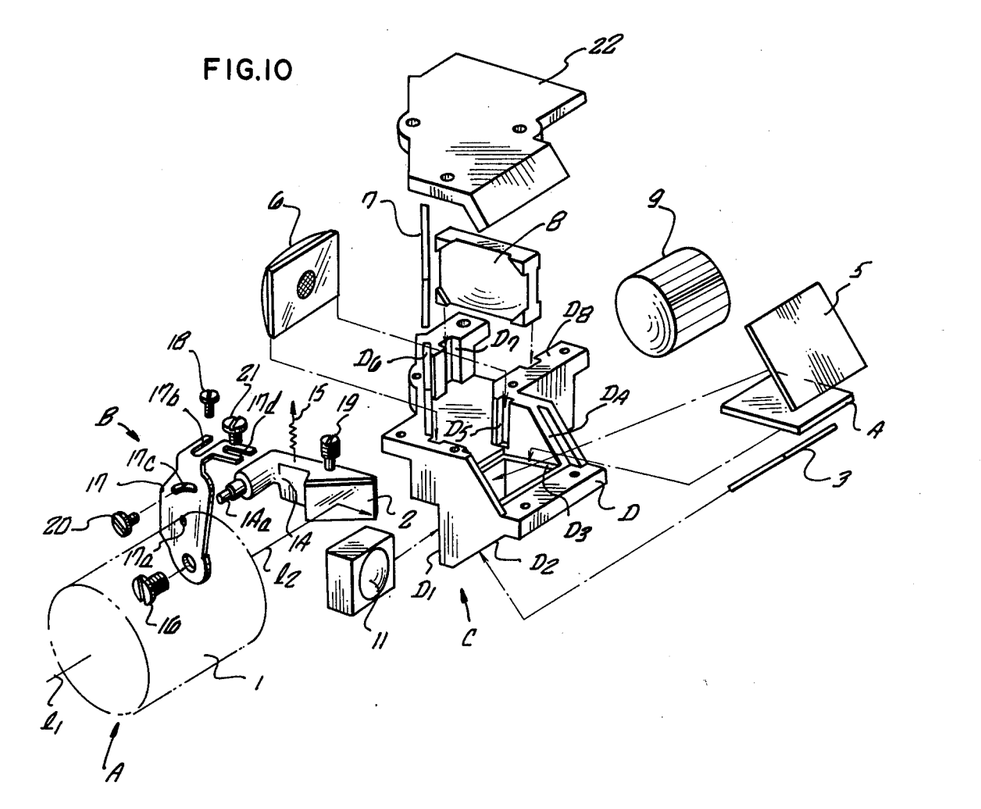
FIG. 10 is an exploded perspective view of a preferred embodiment of the present invention.

The specific detailed constructional features of the present invention are disclosed in a perspective exploded view in FIG. 10. In this embodiment, the viewfinder optical system is disclosed in correlation with a viewfinder body C. The viewfinder body, C, can align and hold the various optical elements and can be sealed to prevent the ingress and clinging of dust on interior optical elements which would impair the accuracy of the viewfinder optical system. The taking lens assembly, A, includes a taking lens, 1, and a master relay lens, 9, adjacent the film plane. The movable mirror assembly B, is specifically shown in an exploded view to disclose the position adjusting features for calibrating and adjusting the movable mirror 2. The movable mirror assembly B, is appropriately placed in a depression provided on the camera body (not shown) that permits a pivotal mounting of the movable mirror 2.

The viewfinder body C, is actually a subassembly component which supports a finder master lens 11, a first reflecting mirror 3, a dust protective flat glass 4, a second reflecting mirror 5, a focusing plate 6, a third reflecting mirror 7, and an eye piece 8.

The taking lens assembly A, includes a taking lens 1, as a front lens group, which is an afocal lens system and the master relay lens 9 in a rear lens group. The front lens group focuses an image in combination with the master relay lens 9 in the rear lens group.

The mirror moving assembly or mechanism B, supporting the first movable mirror 2, has a rotatable shaft 14 that can be adjustably mounted relative to a camera body (not shown). The movable mirror 2, is movable between a first viewfinder position, in which the movable mirror 2 intersects the optical axis $l_2$ of the taking lens 1 and a picture taking position, in which the movable mirror 2 is retracted from the photographic light path $l_2$. The viewfinder body C, includes a mounting block D, that can be made of a material such as metal or synthetic resin that allows a ready machining or molding and is preferably non-transparent. The mounting block D, includes a first mounting surface D1 for mounting an objective master lens 11; a second mounting surface D2 for mounting the first reflective mirror 3; a third mounting surface D3 for supporting the dust protective flat glass 4; and a fourth mounting surface D4 for supporting the second reflecting mirror 5. Mounting slots or a fifth supporting surface D5 are adapted to receive and hold focusing plate 6 in a predetermined position on the mounting body D. An additional mounting site or slot, D6, supports the third reflecting mirror 7 in a predetermined fixed position relative to the focusing plate 6. Finally, the mounting slot D7 positions at least one lens 8 in a lens system forming the eye piece of the viewfinder. The upper surface D8, is capable of sealingly supporting a viewfinder cover 22. Once the viewfinder cover 22 is mounted, it cooperates with the optical components such as the eye piece 8, the flat glass 4 and second reflecting mirror 5, to enclose the viewfinder optical path and prevent the entrance of dust.

During manufacturing, the dust protective flat glass 4, the focusing plate 6, and the third reflecting mirror 7, are secured to their respective attaching surfaces D3, D5 and D6. Additionally, the finder master lens 11, first reflecting mirror 3, second reflecting mirror 5 and at least one piece of the eye piece lens assembly 8 are attached to the respective surfaces D1, D2, D4 and D7 respectively. Finally, the finder cover 22 is secured to the surface D8, thus completing the assembly of the viewfinder body C. As can be appreciated, the respective positions of the optical elements have been predetermined by the viewfinder body C, and are not subject to relative adjustment. Additionally the viewfinder assembly is now in the form of a subcomponent module and is adapted to be mounted as a subcomponent directly in the camera body. The focusing plate 6 is set in a position where the object light reflected by the movable mirror 2 is focused through the finder master lens 11. At this position of the focusing plate 6, there can be obtained the same object image as the image which will be formed on the film by the light rays directed through the taking lens portion A, e.g., the taking lens 1 and the master relay lens 9. Additionally, the respective positions and design of the mounting slots and surfaces D7 and D3 are respectively arranged to receive the eye piece and dust protective flat glass 4 so that any dust clinging to the surfaces of these optical elements will not interfere with the focusing operation. For example these respective optical components can be set at respective distances from the focusing plate 6 which will provide a difference in diopter. Obviously the mounting of the focusing plate 6 within the sealed viewfinder assembly will prevent the accumulation of any dust on the focusing plate 6.

The viewfinder is positioned in the camera body, coincidence with the movable mirror 2 so that the viewer will see a focused image that coincides with or is included in the field of view of the front lens group. While, the top cover 22 helps prevent any ingress of dust, it also hinders any adjustment of the optical elements such as the focus plate within the viewfinder module. Thus, the careful predetermined design parameters which permit the easy manufacturing of a compact viewfinder module subassembly which is dust free also limits the ability to initially calibrate the viewfinder system. This problem, however, is removed by the specific design and mounting of the movable mirror 2 in accordance with the present invention.

Generally, the prior art single lens reflex cameras require that the position of their focusing plates and the film surface be conjugate with that of the movable mirror and as a result focusing cannot be adjusted by means of the movable mirror. The present invention, however, has designed its movable mirror so that it can be adjusted along the optical path at its juxtaposition relative to the focusing plate and permits an accurate focusing on the focusing plate 6.

As can be seen from FIG. 10, a pivotable mirror supporting member 14 supports the movable reflecting mirror 2 and has a shaft 14A which is capable of being loosely fitted within a hole 17A of a supporting arm 17. The supporting arm 17 is pivotally supported relative to the camera body by means of a screw 16. The mirror supporting member 14 is spring biased by a spring 15 to cause the movable mirror 2 to be retracted from the optical axis $1_2$ of the front lens group 1 during a picture taking process. The supporting arm 17 has a cross-sectional L-shape and is adapted to interface with a support ledge on the camera body (not shown). An eccentric screw 18 is secured to the camera body and is fitted in the U-shaped cutaway portion 17b in the tip portion of the supporting arm 17. Due to the variance of the shaft diameter of the screw 18, a pivotal movement is provided, when the screw 18 is rotated. This displacement is transmitted to the support arm 17, thus, the rotation of the eccentric screw 18 may adjust the position of the movable reflecting mirror 2 in a horizontal direction perpendicular to the optical axis and thereby varying the focal length of the optical path along the optical axis $1_2$ and $1_5$. A set screw 20 is threaded into the camera body through the arcuate slot 17C in the support arm 17. Tightening the set screw 20 will hold the desired position of the mirror support arm 14. An additional set screw 21 is mounted in a U-shaped cutaway slot 17D in the support arm 17. This second set screw 21 further insures a locked and precise focusing position to the movable mirror 2. To insure that a full image is properly projected, a screw 19 is operatively attached to the movable mirror 2 and is capable of adjusting the position of the movable mirror relative to the retaining member 14 on the vertical axis.

Thus, when the SLR pocket camera is assembled with the viewfinder module mounted on the camera body, any fine adjustment or calibration of the focus of the viewfinder optical system can be accomplished from the exterior of the camera body without requiring any entrance into the viewfinder subassembly or subjecting the viewfinder subassembly to the entrance of dust and debris. As can be appreciated, subsequent focusing adjustments are normally utilized during actual photography. This initial focusing or calibration provides a datum point for any lens system added to the camera body. Obviously, various forms of camming members and the like could be utilized by persons skilled in the art to permit relative adjustment of the movable mirror 2, for calibration once given the purpose and concept of the present invention.

Accordingly, the present invention should be measured solely from the following claims, in which I claim:

1. A small single lens reflex camera comprising:
   a small housing body;
   a taking lens assembly attached to the camera body and having an optical path through the camera body including an objective focal lens system and a relay lens assembly;
   a movable mirror movably mounted relative to the camera body between a first position intersecting the optical path and a second position not intersecting the optical path, the movable mirror being movably interposed between the objective lens system and the relay lens system, the relay lens assembly further including a first relay lens for focusing the light rays on a film plane; and
   a viewfinder optical system attached to the camera body and operatively positioned relative to the first position of the movable mirror to receive light rays from the movable mirror including a focusing surface member for providing an image of an object, a second viewfinder relay lens for focusing the light rays from the object lens system on the focusing surface member, means for magnifying the image and at least three reflecting mirrors, the first and second reflecting mirrors forming an included angle of substantially 90° between their reflecting surfaces and inclined at a predetermined angle relative to the optical path of said taking lens assembly so as to make an angle ($\beta$) between an optical axis incident on the first reflecting mirror and an optical axis emitting from the second reflecting mirror, said angle ($\beta$) being within the range from 4° to 32°, the third reflecting mirror further transmitting the light rays to the magnifying means, a major angle, $\alpha$, formed between the reflecting surface planes of the third reflecting mirror and the movable mirror being within the range of $92° < \alpha < 106°$, whereby the viewfinder optical system will comply with the compact design parameter of the camera while providing a relatively large and bright viewfinder image.

2. The invention of claim 1 wherein the second relay lens is positioned between the movable mirror and the first reflecting mirror.

3. The invention of claim 1 wherein the viewfinder optical system is a separate self-contained module attached to the camera body.

4. A small single lens reflex camera comprising:
a small housing body;
a taking lens assembly attached to the camera body and having an optical path through the camera body;
a movable mirror movably mounted relative to the camera body between a first position intersecting the optical path for reflecting the incident light rays from the taking lens assembly at a right angle, and a second position not intersecting the optical path;
a viewfinder optical system attached to the camera body and operatively positioned relative to the first position of the movable mirror to receive light rays from the movable mirror including a focusing surface member for providing an image of an object, means for magnifying the image including at least a lens eye piece, and at least three reflecting mirrors, the first reflecting mirror receiving the reflected light rays from the movable mirror, the second reflecting mirror forming an included angle of substantially 90° between its reflecting surface and the reflecting surface of the first reflecting mirror, the first and second reflecting mirrors mounted so that their reflecting surfaces provide an angle $\beta$ between a pair of planes, one plane containing an optical axis of the light rays incident on the first reflecting mirror and being perpendicular to a horizontal plane including the optical axis of the taking lens assembly optical path and also the reflected light rays from the movable mirror and the other plane including an optical axis of the light rays emitting from the second reflecting mirror and being perpendicular to the horizontal plane, the angle ($\beta$) being within the range from 4° to 32°, the third reflecting mirror further transmitting the light rays to the magnifying means, a major angle, $\alpha$, formed between the reflecting surface planes of the third reflecting mirror and the movable mirror being within the range of $92° < \alpha < 106°$, and a focusing surface member provided between the second and third reflecting mirrors for providing the image of the object, whereby the viewfinder optical system will comply with the compact design parameter of the camera while providing a relatively large and bright viewfinder image.

5. The invention of claim 4 wherein the taking lens assembly includes an objective focal lens system and a relay lens assembly, the movable mirror being movably interposed between the objective lens system and the relay lens assembly, the relay lens assembly further including a first relay lens for focusing the light rays on a film plane and a second viewfinder relay lens for focusing the light rays from the object lens system on the focusing surface member.

6. The invention of claim 4 wherein the camera body has an approximately flat rectangular shape and the movable mirror reflects light rays paralled to the axis of the longest dimension.

7. The invention of claim 4 wherein the means for magnifying the image includes a magnifier lens assembly movably attached to the camera body.

8. The invention of claim 4 wherein the viewfinder optical system further includes a second relay lens and cover means for sealing the image space defined by the second relay lens, and the first, second and third reflecting mirrors.

9. The invention of claim 8 further including a mounting member with nonadjustable mounting sites for the focusing surface member and the first, second and third reflecting mirrors.

10. The invention of claim 9 further including a transparent dust protective member mounted on the mounting member between the first and second reflecting mirrors.

11. The invention of claim 4 wherein the viewfinder system is a separate self-contained module attached to the camera body.

12. The invention of claim 4 wherein the viewfinder system includes covering means for sealing the focusing surface member and the reflecting mirrors.

* * * * *

UNITED STATES PATENT AND TRADEMARK OFFICE
CERTIFICATE OF CORRECTION

PATENT NO. : 4,119,982

DATED : October 10, 1978

INVENTOR(S) : Toshinori Imura and Maki Yamashita

It is certified that error appears in the above-identified patent and that said Letters Patent are hereby corrected as shown below:

Column 3, line 67, delete "towards a lens" and insert therein --toward a lens--.

Column 10, line 36, delete "relay lens system" and insert therein --relay lens assembly--.

Signed and Sealed this

Thirteenth Day of March 1979

[SEAL]

Attest:

RUTH C. MASON
Attesting Officer

DONALD W. BANNER
Commissioner of Patents and Trademarks